(12) United States Patent
Terradellas Callau et al.

(10) Patent No.: US 10,518,563 B2
(45) Date of Patent: Dec. 31, 2019

(54) CONVEYOR BELT SENSORS

(71) Applicant: Hewlett-Packard Development Company, L.P., Houston, TX (US)

(72) Inventors: Roger Terradellas Callau, Sant Cugat del Valles (ES); Daniel Gutierrez Garcia, Badalona (ES); Raimon Castells De Monet, Barcelona (ES); Joseba Fernandez Guinea, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/759,120

(22) PCT Filed: Sep. 18, 2015

(86) PCT No.: PCT/US2015/050880
§ 371 (c)(1),
(2) Date: Mar. 9, 2018

(87) PCT Pub. No.: WO2017/048272
PCT Pub. Date: Mar. 23, 2017

(65) Prior Publication Data
US 2018/0281472 A1   Oct. 4, 2018

(51) Int. Cl.
| | | |
|---|---|---|
| *B41J 11/42* | (2006.01) |
| *B41J 11/00* | (2006.01) |
| *B65H 29/24* | (2006.01) |
| *G01V 8/12* | (2006.01) |
| *B65H 43/08* | (2006.01) |

(52) U.S. Cl.
CPC ............. *B41J 11/42* (2013.01); *B41J 11/007* (2013.01); *B65H 29/242* (2013.01); *B65H 43/08* (2013.01); *G01V 8/12* (2013.01); *B65H 2511/512* (2013.01); *B65H 2513/10* (2013.01)

(58) Field of Classification Search
None
See application file for complete search history.

(56) References Cited

U.S. PATENT DOCUMENTS

| | | |
|---|---|---|
| 4,745,435 A | 5/1988 | Sakata et al. |
| 5,828,387 A | 10/1998 | Wataya et al. |
| 6,246,857 B1 | 6/2001 | Tanaka |
| 6,842,602 B2 * | 1/2005 | Kudo .................. G03G 15/757 347/116 |
| 7,270,232 B2 | 9/2007 | Schiltz |
| 7,873,310 B2 | 1/2011 | Yokota |

(Continued)

FOREIGN PATENT DOCUMENTS

| | | |
|---|---|---|
| CN | 2108819 | 7/1992 |
| CN | 1746028 | 3/2006 |

(Continued)

*Primary Examiner* — Alejandro Valencia
(74) *Attorney, Agent, or Firm* — HP Inc. Patent Department

(57) ABSTRACT

Examples described herein include methods and devices for systems that include a conveyor belt comprising an exterior surface and an interior surface, an embedded optical sensor disposed proximate to the interior surface of the conveyor belt to optically detect movement of the conveyor belt, and a driver to move the conveyor belt based on the detected movement of the conveyor belt.

13 Claims, 6 Drawing Sheets

(56) References Cited

U.S. PATENT DOCUMENTS

| | | |
|---|---|---|
| 8,020,958 B2 | 9/2011 | Murashima |
| 8,364,071 B2 | 1/2013 | Noguchi et al. |
| 2003/0128253 A1* | 7/2003 | Kitahara ............... B41J 2/155 347/42 |
| 2006/0219529 A1 | 10/2006 | Schiltz |
| 2007/0139459 A1 | 6/2007 | Furuya |
| 2012/0125736 A1 | 5/2012 | Twigger et al. |
| 2013/0033535 A1 | 2/2013 | DeJong et al. |

FOREIGN PATENT DOCUMENTS

| | | |
|---|---|---|
| CN | 102079166 | 6/2011 |
| CN | 203740459 | 7/2014 |
| CN | 104220348 | 12/2014 |
| JP | 2000191175 | 7/2000 |
| WO | WO-2014047512 | 3/2014 |

\* cited by examiner

CONVEYOR BELT SENSORS

BACKGROUND

Conveyor belts are used in a wide variety of applications to move, position, and carry objects and materials. As such, many conveyor belts have been designed with a particular application or purpose in mind. For example, some conveyor belts include robust belts and strong rollers and motors to move large amounts of heavy or dense material, such as ore, dirt, gravel, and the like, from one place to another. Conveyor belts with specialized belts driven with precision motors or steppers have been developed to position and move materials, media, and parts during printing and manufacturing processes. For example, printers and printing presses can use conveyor belts to move print media (e.g., paper, cardstock, transparencies, boards, cardboard, etc.), in coordination with print heads, sprayers, or electro-photographic drums to produce a printed image, pattern, or graphic.

DETAILED DESCRIPTION

The present disclosure includes descriptions of example devices, systems, and methods for tracking the movement and position of the conveyor belt using an embedded optical sensor. In such implementations, a conveyor belt assembly may include a conveyor belt disposed around a set of rollers and driven by a driver motor. The conveyor belt assembly may also include an embedded optical sensor for detecting the movement and/or position of the conveyor belt as it moves around the rollers. As such, the conveyor belt can have an exterior surface and interior surface. The exterior surface can be used to move materials, while the interior surface can make contact with the rollers and/or the driver motor that drives the conveyor belt.

In various implementations of the present disclosure, an embedded optical sensor can be positioned in the conveyor belt assembly to detect the movement or position of an interior surface of the conveyor belt. The optically detected movement or position of the conveyor belt can be used to make adjustments to the speed or position of the conveyor belt. In such implementations, the adjustments are made by adjusting the speed or position of the driver motor and/or the associated roller. The same optically detected movement or position of the conveyor belt can be used to make adjustments to the operation of complementary devices (e.g., a print heads, sprayer, imaging drums, etc.), to compensate for any slippage between the conveyor belt and the rollers and/or driver motor.

In one example, a conveyor belt assembly with embedded optical sensor can be implemented as a carrier platform for moving print media in a printer or printing press in coordination with a printing device, such as a print head, a sprayer, an imaging drum, and the like. In such implementations, the conveyor belt may be precisely controlled to improve accuracy in the position and/or advancement of the print media with respect to other components of the printer or printing press to produce high quality printed images.

Figure 1:
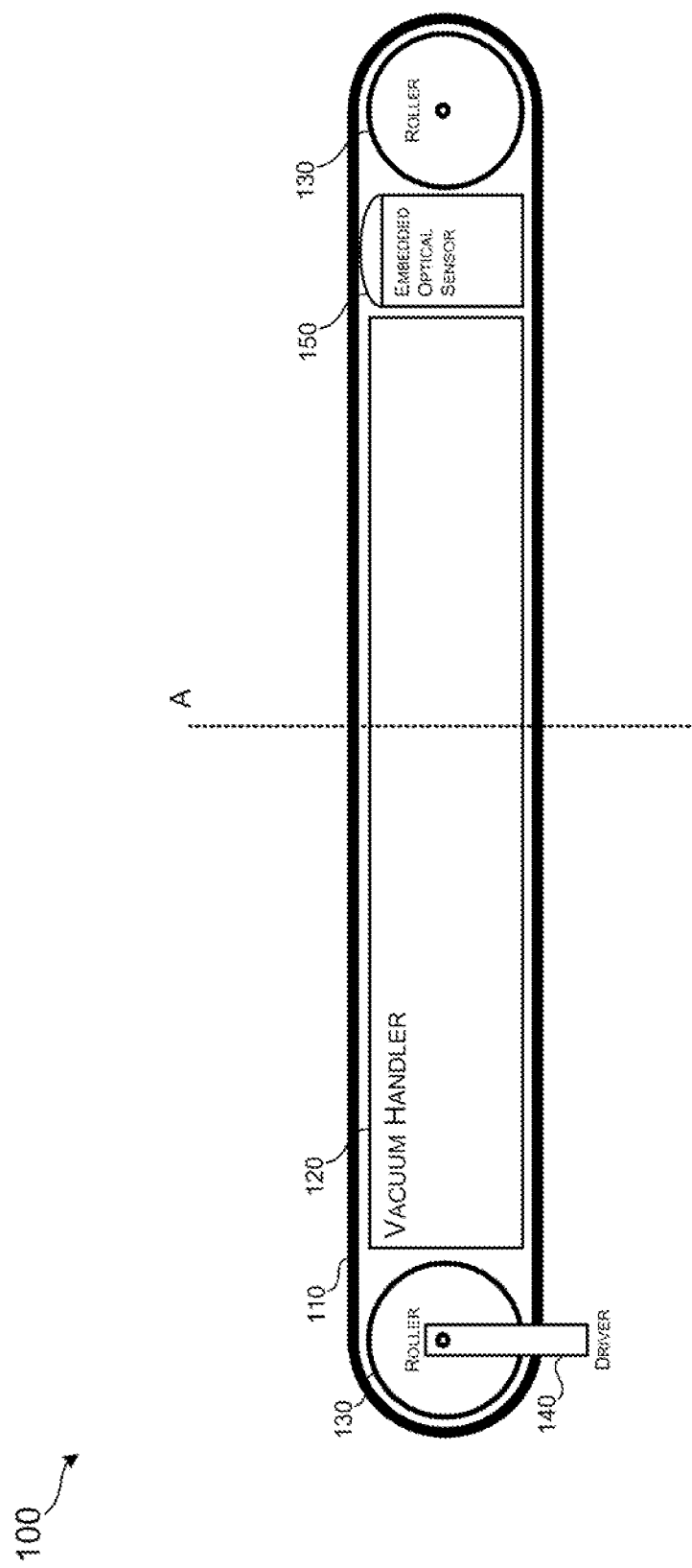
FIG. 1 illustrates an example conveyor belt assembly with an embedded optical sensor.

FIG. 1 depicts an example conveyor belt assembly 100 according to implementations of the present disclosure. As shown, the conveyor belt assembly 100 can include a conveyor belt 110 disposed around rollers 130. In the example shown, only two rollers 130 are shown, however, other implementations can include more than two rollers 130. The conveyor belt 110 can include a loop or band of material with sufficient flexibility to bend or deform around the rollers 130. For example, the conveyor belt 110 can include a belt of flexible material, such as rubber loop, a textile band, and the like. In some implementations, the conveyor belt 110 can include segmented rigid or semi-rigid sections coupled to one another by hinged connectors.

In any of such implementations, the conveyor belt 110 includes an exterior surface and an interior surface. The exterior surface can be used as the surface on which materials, media, or objects are carried. The object may be held to the exterior surface by gravity, friction, clamps, or vacuum. The interior surface is the surface of the conveyor belt 110 in contact with or disposed in proximity to the rollers 130. As such, the conveyor belt 110 can define an interior and exterior of the conveyor belt assembly 110. For example, the region within the confines of the loop of the conveyor belt 110 and proximate to the interior surface of the conveyor belt 110 can be referred to herein as the interior of the conveyor belt assembly 100.

The particular example conveyor belt assembly 100 depicted in FIG. 1 can be implemented in various devices for various purposes. For example, the conveyor belt assembly 100 can be used as a print media handler in a printer or printing press.

As shown, example conveyor belt assembly 100 can include a driver motor 140 to apply a force to rotate a roller 130. In turn, the roller 130 can apply a force to the conveyor belt 110 that causes it to move about the rollers 130. In the example shown, the driver motor 140 drive only one of the rollers 130, however, in other examples, the driver motor 140 can include multiple driver motors to drive corresponding rollers 130 (e.g., multiple driver motors to drive multiple rollers). Accordingly, the exterior surface of the conveyor belt 110 can be moved in either direction in response to the force that the driver motor 140 applies to a roller 130. If the driver motor 140 drives a roller 130 to rotate in one direction, the conveyor belt 110 will move in a corresponding direction. Similarly, if the driver motor 140 drives the roller 130 to rotate in an opposite direction, the conveyor belt 110 will move in the opposite corresponding direction. As such, the rotational movement of the driver motor 140 and/or the roller 130 can be translated into corresponding linear motion of the interior and exterior surfaces of the conveyor belt 110. The linear motion of the exterior surface of the conveyor belt 110 can then be used to move material disposed thereon.

The conveyor belt assembly 100 can include a vacuum handler 120 to exert vacuum pressure on an object (e.g., a print media) disposed on the exterior surface of the conveyor belt 110 to hold the print media in place against the conveyor belt 110. In such implementations, the conveyor belts 110 can include openings, channels, or holes through which the vacuum handler 120 can apply the vacuum to the print media. The vacuum handler 120 can thus provide a force that increases the friction between the object and the exterior surface of the conveyor belt 110 to prevent the object disposed on the exterior surface of the conveyor belts 110 from slipping as the conveyor belt 110 moves. As such, when the conveyor belt 110 moves, it can be assumed that the object also moves with no slippage. For example, the vacuum handler 120 can hold print media, such as paper, cardstock, boards, metal sheets, plastic sheets, and the like securely to the exterior of the conveyor belt 110 so that when the conveyor belt moves, the print media also moves without slipping, curling, or lifting.

In various implementations, the example conveyor belt assembly 100 can also include an embedded optical sensor 150 to optically detect the movements of the conveyor belt 110. Because an object, such as a print media, disposed on the exterior surface of the conveyor belt 110 can be held in place by the vacuum pressure provided by the vacuum handler 120, the optically detected movements of the conveyor belt 110 can be directly translated to movement of the object as well. As such, the movement or position of the object carried by the conveyor belt assembly 100 can be tracked by tracking the movement of the conveyor belt 110.

In various implementations, the embedded optical sensor 150 can include a light sensor or complementary optical components for detecting the movements of the interior surface of the conveyor belt 110. For example, the embedded optical sensor 150 can include a complementary metal-oxide semiconductor (CMOS) sensor, a charge coupled device (CCD) sensor, a photomultiplier, or any type of light-sensitive electronic device. The optical components of the embedded optical sensor 150 can include any configuration of lenses, light guides, optical fibers, mirrors, etc.

In some implementations, the embedded optical sensor 150 can also include a light source (not shown), such as an LED, an incandescent lamp, a laser, and the like, to illuminate the interior surface of the conveyor belt 110. In other implementations, the light source can be a separate device and directed toward the region that the embedded optical sensor 150 is intended to detect. The spectral content of the light source can be specifically selected to increase the detectability of the movement of the conveyor belt 110.

In other implementations, instead of, or in addition to, detecting light reflected off the interior surface of the conveyor belt 110, the optical sensor 150 can detect light that passes through the conveyor belt 110. For example, in implementations in which the conveyor belt 110 includes perforations, holes, or other gaps, the embedded optical sensor 150 can detect differentials in light that passed through the conveyor belt 110 as it moves. In such implementations, a light source can be disposed in proximity to the exterior of the conveyor belt 110 to provide the "bright" light signal reference point.

In some implementations, the optical components can include lenses that include profiles and optical power to conform to or match the shape and/or dimensions of the interior of the conveyor belt 150. For example, optical components of the embedded optical sensor 150 can include a light guide or lens disposed in dose proximity to the interior surface of the conveyor belt 110 to detect variations in the light received from or through the conveyor belt 150. The same or complementary optical components can be used to guide or focus light from a light source onto a region of the interior surface of the conveyor belt 110 monitored by the embedded optical sensor 150.

In some implementations, the optical components can include an imaging lens focused on the inherent pattern, texture, or grain of the material of the conveyor belt 110. In other implementations, the interior surface of the conveyor belt 110 can include regularly or randomly arranged markings that provide contrasting levels of reflectance relative to the inherent reflectance of the material of the conveyor belt 110. For example, the markings can include a series of regularly spaced dots, lines, or hash marks, imprinted on the interior surface of the conveyor belt 110. In such implementations, the markings can be made with an ink, paint, pigment, or other material that is lighter than or darker than the material of the conveyor belt 110 so as to provide contrasting reflectance. In some implementations, the markings can include a material that has a different specular reflectance characteristic (e.g., shininess) relative to the material of the conveyor belt 110. For example, the markings can be glossy while the material on the interior of the conveyor belt 110 is matte.

For example, the interior surface of the conveyor belt 110 can be embedded with shiny metal pieces (e.g., foil) that may be more reflective than the surrounding material (e.g., rubber, fabric, etc.) in the interior of the conveyor belt 110. As such, the light received by the embedded optical sensor 150 from the conveyor belt 110 can be reflected off the interior surface and any markings thereon. As the conveyor belt 110 moves, the frequency or speed with which the embedded optical sensor 150 detects variations in the reflected light can be interpreted as movements of the belt. In implementations in which the markings are regularly spaced (e.g., arranged with a known distance between the markings) the time between detected bright and/or dark signals can be used to calculate the speed with which the conveyor belt 110 is moving.

In some implementations, determined speed can be an absolute speed. The absolute speed can be used to determine the absolute position or orientation of the conveyor belt 110 in the conveyor belt assembly 110.

In some implementations the conveyor belt 110 can be subjected to uneven heating, such that the material of the conveyor belt may contract and expand unevenly and thus change the spacing between the markings. In such implementations, the light and dark signals detected by the embedded optical sensor 150 can be used to calculate a relative speed. The relative speed can be determined relative to the known the speed of the roller 130 driven by the corresponding driver motor 140. As such, the relative speed can describe a differential between the speed at which the roller 130 is being driven and the speed at which the conveyor belt 110 is actually moving. Accordingly, the relative speed can describe slippage between the conveyor belt 110 and the roller 130 driven by the driver motor 140. The relative speed can be used to determine the relative position or orientation of the conveyor belt 110.

In various implementations, optical sensor 150 can be located proximate to a region of the interior surface of the conveyor belt 110 opposite a region of the exterior surface of the conveyor belt 110 that is near a print engine. The region of the exterior surface of the conveyor belt 150 near a print engine is referred to herein as the "print zone". In such implementations, use of the embedded optical sensor 150 can compensate for the effects of uneven or localized heating of the conveyor belt 110 in the print zone. For example, some printing technologies, such as large format latex printing, piezoelectric inkjet printing, thermal inkjet printing, and other printing technologies that use heat in some part of the printing process (e.g., during the application, drying, or curing of print material) in the print zone or other region of the conveyor belt 110, can cause the conveyor belt 110 and/or the print media to heat up and cool down unevenly. Some conveyor belt materials can expand contract, or change other physical properties of the belt material, when subjected to heating and cooling. Expansion and contraction of the conveyor belt 110 can alter the length, or potentially change the coefficient of friction or elasticity of the conveyor belt 110. Such physical changes to the conveyor belt 110 can change the movement or speed of the belt in response to a particular speed of the drive motor 140. Information regarding the movement and speed of the conveyor belt 110 optically detected by the embedded optical sensor 150 in localized regions, such as the print zone, can be used to compensate for effects of heating or cooling of the conveyor belt 110. For example, the optically detected movement of the conveyor belt 110 implemented in a printer can be used to accurately position or move the conveyor belt 110, and/or a print media disposed thereon, relative to a print engine (e.g., in the print zone) to produce a printed image.

In various implementations of the present disclosure, information regarding the relative movement, speed, or position of the conveyor belt can be used to apply corrections to the movement, speed, or position of roller 130 and/or driver motor 140. For example, if the speed of the conveyor belt 110 as determined by the embedded optical sensor 150 is determined to be slower than expected according to the signal sent (e.g., drive current or voltage) to the driver motor 140, then the signal that controls the driver motor 140 can be adjusted to drive roller 130 and/or the conveyor belt 110 faster to compensate for the slippage. Similarly, if the position of the conveyor belt 110 as determined by the embedded optical sensor 150 is determined to be off from where it is expected to be (e.g., not in the correction position relative to other components of a printer, such as print engine or dryer), then the signal that controls the driver motor 140 can be adjusted to drive roller 130 and/or the conveyor belt 110 either forward or backward to correct the positioning of the conveyor belt 110.

Figure 2:
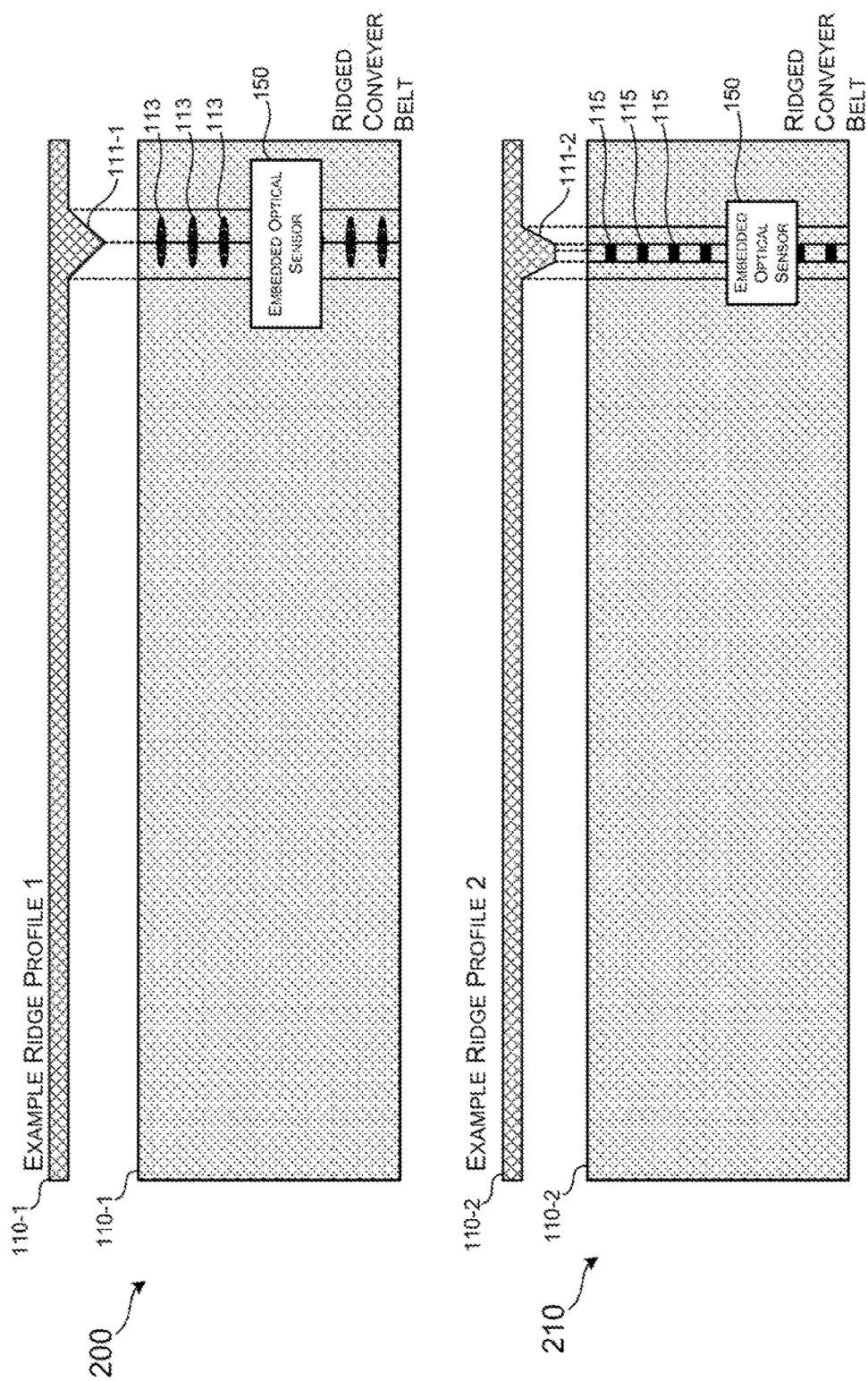
FIG. 2 illustrates two example conveyor belt profiles with optical markings.

As described in reference to FIG. 1, the embedded optical sensor 150 can be disposed in the conveyor belt assembly 110 proximate to the interior surface of the conveyor belt 110. To assist in maintaining the alignment of the conveyor belt 110 on the rollers 130, and consequently the interior surface and markings thereon, relative to the embedded optical sensor 150, various implementations of the present disclosure include a ridge disposed on the interior surface of the conveyor belt 110. FIG. 2 depicts cross-sectional corresponding views 200 and 210 of the interior surface of two example conveyor belts 110. The cross-sectional views are shown from the perspective of direction A, illustrated in FIG. 1.

Example 200 depicts a ridged conveyor belt 110-1 that has an example triangular or V-shaped ridge profile 111-1. Example 210 depicts a ridged conveyor belt 110-2 that has an example trapezoidal or truncated V-shaped ridge profile 111-2. The examples 200 and 210 depicts two examples of various possible ridge profiles 111. The shape, angle, location, and dimension of the ridge profile 111 on a particular conveyor belt 110 can vary based on the dimensions of the rollers 130 and/or the location, size, and cross sectional profile of a groove in the rollers 130. For example, the dimensions and angles of the ridge profiles 111 can correspond to grooves (not shown) in the rollers 130. The ridge profiles 111 can be dimensioned to fit into the grooves to help keep the conveyor belts 110 aligned on the rollers 130 and/or with respect to the embedded optical sensor 150 or other devices.

The example ridge profiles 111-1 and 111-2 can also include the markings 113 and 115, respectively. As described herein, the markings 113 and 115 can include variations in the material of the conveyor belts 110-1 and 110-2. For example, the markings 113 and 115 can include ink or paint. In other implementations, the markings 113 and 115 can include embedded materials that have a different reflectance, color, specular reflection characteristic (e.g., matte, glossy, etc.), or other optical characteristics that the embedded optical sensor 150 can detect when the ridge conveyor belts 110-1 and 110-2 are moved by respective rollers 130 and/or driver motor 140. The embedded optical sensor 150 can be disposed at any angle relative to the interior surface of the ridged conveyor belt 110 and/or the ridge profiles 111.

The detection of each marking 113 or 115 as it moves by the embedded optical sensor 150 can corresponding to a particular amount of movement. As such, the accuracy of various implementations to detect the movement of the conveyor belt 110 can vary with the number, density, or frequency of markings 113 and 115. For instance, when the markings are more located closely together (e.g., high density or high frequency), very small movements of the conveyor belt can be detected. When the markings 113 or 115 are positioned with larger distances between each successive marking, larger corresponding movements of the conveyor belt can be detected by the optical scanner. The particular number, density, or frequency of markings 113 and 115 can be selected based on the degree of accuracy with which corrections to the movement of the driver 140 are to be made.

Figure 3:
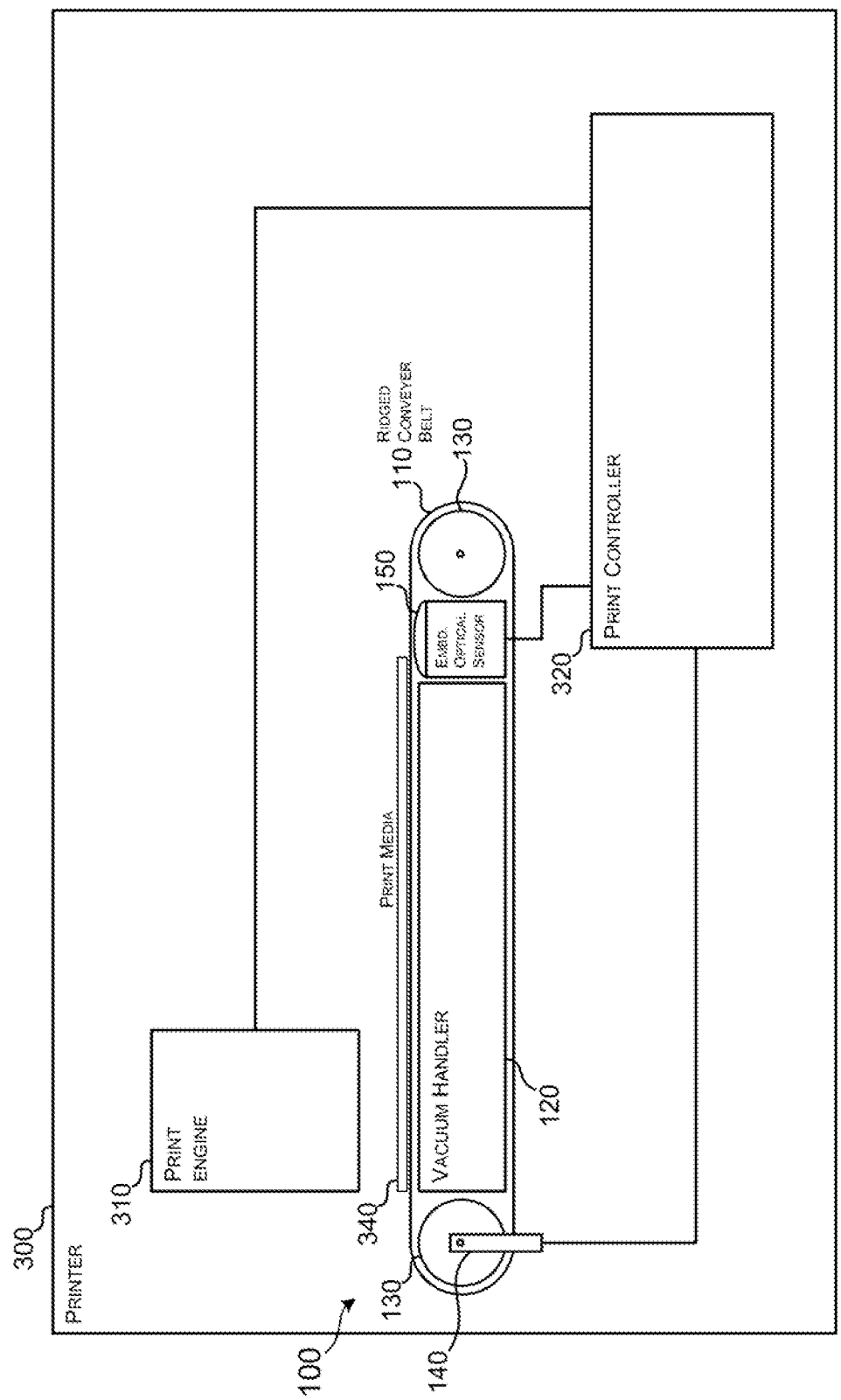
FIG. 3 is a schematic diagram of an example printer equipped with a conveyor belt assembly with an embedded optical sensor.

FIG. 3 depicts a schematic diagram of an example printer 300 that includes conveyor belt assembly 100, according to various implementations of the present disclosure. As shown, the printer 300 can also include a print engine 310, and a print controller 320 to control the print engine 310 and the conveyor belt assembly 100. For example, the print controller 320 can include functionality for sending drive signals to the driver motor 140 that turns the roller 130 to move the conveyor belt and/or any print media 340 disposed thereon. The control signals sent to drive the drive motor 140 can include currents and/or voltages to move the roller 130 at specific speeds and/or distances. In some implementations, the driver motor 140 can also include an encoder that measures the movement of the roller 130 that is driven to determine exactly how much and how quickly the roller 130 moves. In such implementations, the print controller 320 can receive a signal and/or information from the driver motor 140 that corresponds to the distance traveled by or the speed of the roller 130 under a particular drive signal. The information regarding the movement or speed of the driver motor 140 can be monitored to make adjustments to the movement or speed of the driver motor 140 or operation of other components of the printer 300.

The print controller 320 can also include functionality for driving the print engine 310. For example, the print controller 320 can include functionality for generating or receiving print data from an external source (e.g., a computing device, a memory, or a network, etc.). The print data can include information or encoded data that can be used to render an image. The print controller 320 can then generate instructions, based on the print data, for controlling the print engine 310 to apply a printing material to the print media 340 to generate a corresponding printed image.

In some implementations, the print controller 320 can also include functionality for coordinating the movement of the print media 340 relative to the print engine 310 by sending drive signals the driver motor 140 while simultaneously controlling the print engine 310 in applying printing material. For example, the print controller 320 can control the conveyor belt assembly 100 to move the print media 340 so that a corresponding region of the print media 340 is available to the print engine 310 for application of a corresponding region of the printed image. As such, the print media 340 can be scanned relative to the print engine 310 as it selectively applies printing materials to generate a printed image.

In various implementations, the print controller 320 can include functionality for controlling the embedded optical sensor 150 to detect the motion or position of the conveyor belt 110. For example, the print controller can send control signals to activate the light sensor in the embedded optical sensor 150 to detect variations in the amount of light reflected from the interior surface of the conveyor belt 110 or transmitted through the material of the conveyor belt 150. In some examples, the embedded optical sensor 150 can detect variations in light due to markings included on the interior surface of the conveyor belt 150, such as markings 113 and 115 shown in FIG. 2. As such, the markings can be included or imprinted on the ridges of a ridged conveyor belt, as depicted in example ridged conveyor belts 200 and 210.

Based on the frequency of the variation in light detected, the embedded optical sensor 150 can generate a corresponding light level signal that includes information corresponding to the speed or position of the conveyor belt 150. The light level signals can include a time component such that the light level signal can describe the change in the light levels detected by the embedded optical sensor 150 over time. For example, if the embedded optical sensor observes the markings 115 (e.g., dark lines printed on the flat aspect on the ridge 111-2) as the conveyor belt 110 is driven by the driver motor 140, then the light level signal can include an alternating value that changes over time. The embedded optical sensor 150 can send the light level signal to the print controller 320.

The print controller 320 can analyze the light level signal to determine the absolute or relative movement, speed, or position of the conveyor belt 110. Based on the determined movement, speed, or position of the conveyor bell 110, the print data, and/or the movement, speed, or position of the driver motor 140 or roller 130, the print controller 320 can determine whether the conveyor belt is positioned or moving correctly according to the print data used to control the print engine 310 and/or the driver motor 140. If print controller 320 determines that the conveyor belt 110, and consequently the printing media 340, is not in the correct position or is not moving at the intended speed, the print controller 320 can apply a correction to the signals used to drive the driver motor 140 and/or the print engine 310.

Figure 4:
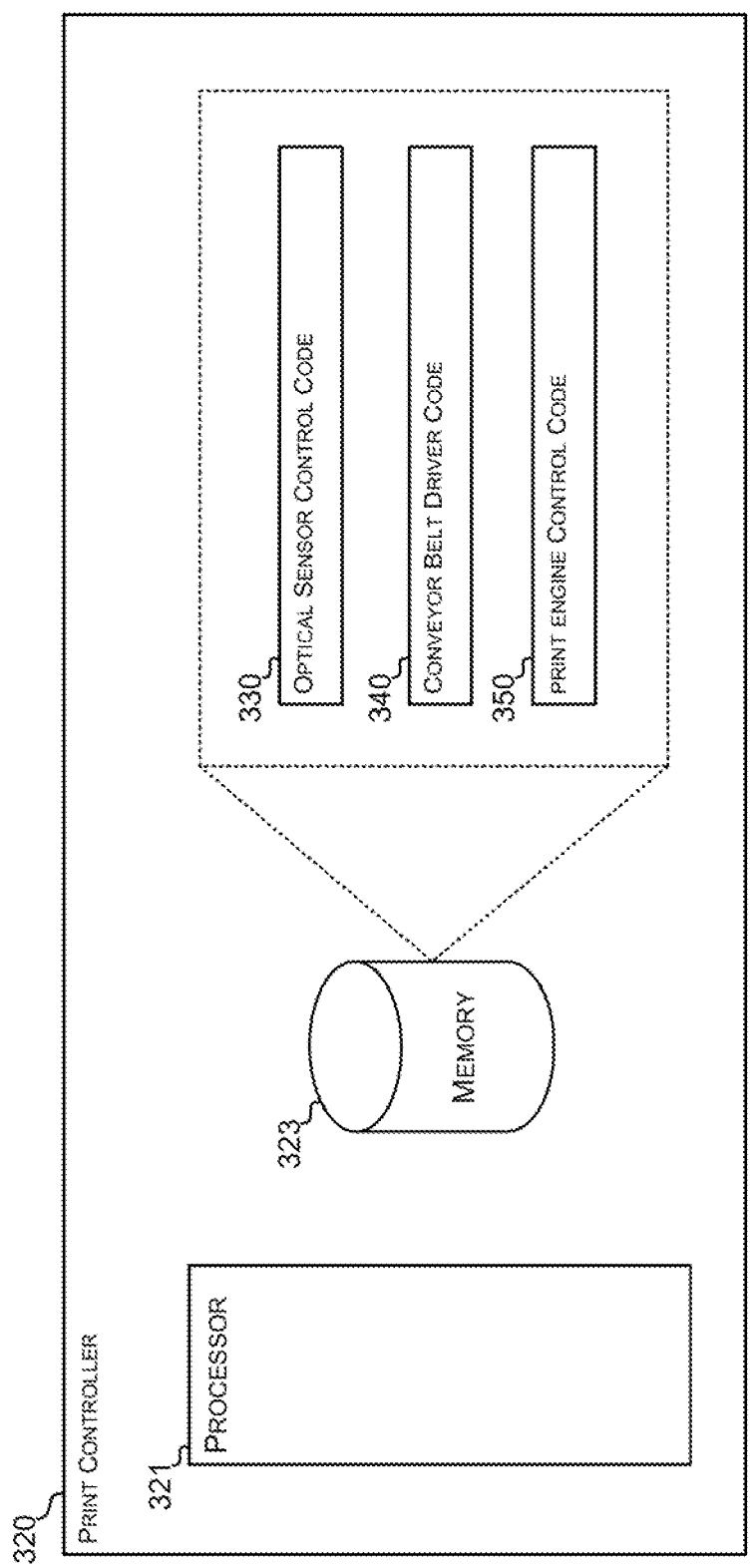
FIG. 4 is a schematic diagram of an example print controller.

As described herein, various examples of the present disclosure can be implemented as any combination of executable code and hardware. For example, implementations can include computer executable code executed by a processor or computing device. For example, the functionality of print controller 320 described herein can be implemented as executable code that includes instructions that when executed by the processor cause the processor to perform operations, or generate signals that cause other device (e.g., components of the printer 300) to perform operations, in accordance with various implementations and example described herein. FIG. 4 depicts a schematic of an example print controller 320 implemented as a combination of hardware and executable code.

As shown in FIG. 4, the print controller 320 can include a processor 321 and a memory 323. The computer executable code that includes instructions for performing various operations of the print controller 320 described herein can be stored in the memory 323.

For example, the functionality for controlling the embedded optical sensor 150 can be implemented as executable optical sensor control code 330 stored in the memory 323 and executed in processor 321. Similarly, the functionality for driving the driver motor 140 and controlling the print engine 310 can be implemented as executable conveyor belt driver code 340 and print engine control code 350, respectively, and stored in memory 323 and executed in processor 321. As such, the executable code stored in the memory 323 can include instructions for operations that when executed by processor 321 cause the processor 321 to implement the functionality described in reference to the example print controller 320.

The processor 321 may be a microprocessor, a microcontroller, an application specific integrated circuit (ASIC), or the like. According to an example implementation, the processor 321 is a hardware component, such as a circuit.

The memory 323 can include any type of transitory or non-transitory computer readable medium. For example the memory 323 can include volatile or non-volatile memory, such as dynamic random access memory (DRAM), electrically erasable programmable read-only memory (EEPROM), magneto-resistive random access memory (MRAM), memristor, flash memory, floppy disk, a compact disc read only memory (CD-ROM), a digital video disc read only memory (DVD-ROM), or other optical or magnetic media, and the like, on which executable code may be stored.

Figure 5:
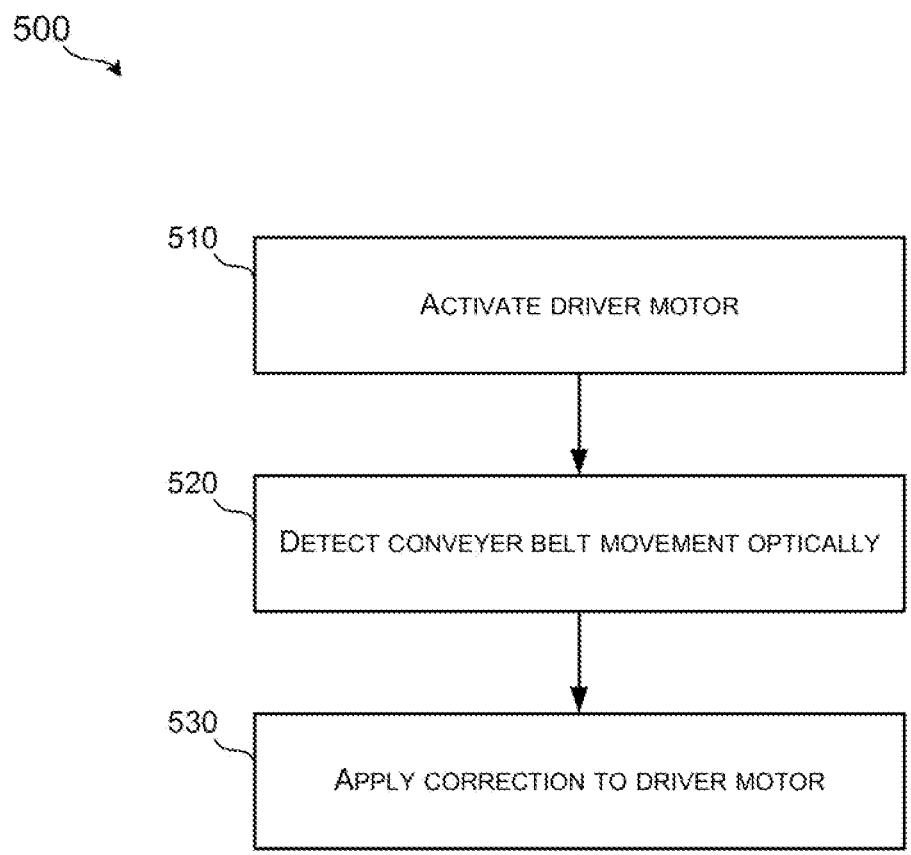
FIG. 5 is a flowchart of an example method for tracking a conveyor belt using an optical sensor.

FIG. 5 is a flowchart of an example method 500 for controlling the conveyor belt assembly 100 according to various implementations of the present disclosure. The method can begin at box 510 in which a print controller 320 can activate a conveyor belt driver motor 140 in a conveyor belt assembly 100 to move a corresponding conveyor belt 110 and/or a print media disposed thereon. In such implementations, activating the driver motor 140 can include sending drive signals to the driver motor 140 to move a print media 340 disposed on the conveyor belt 110 in coordination with the operation of a print engine 310 to generate a printed image on the print media 340.

At box 520, the print controller 320 can operate an embedded optical sensor 150 in the conveyor belt assembly 100 to optically detect the conveyor belt movement and/or position. Optically detecting the conveyor belt movement can include receiving light level signals from the embedded optical sensor 150 corresponding to variations in the light levels detected in, on, or through the conveyor belt 110 at a point in the interior of the conveyor belt assembly 100. In various implementations described herein, the light levels detected can correspond to detecting the movement of markings on the interior surface of the conveyor belt 110. To determine the movement or position of the conveyor belt 110, the print controller 320 can analyze the light level signals.

Based on the optically determined movement or position of the conveyor belt 110, the print controller 320 can apply a correction to the conveyor belt driver motor 140. For example, if the print controller 320 determines that the conveyor belt is moving too slowly due to slippage, or is in an incorrect position, then the print controller 320 can change the speed or direction of the driver motor 140 to change the speed or direction of the conveyor belt 110 and/or the print media 340 disposed thereon.

Figure 6:
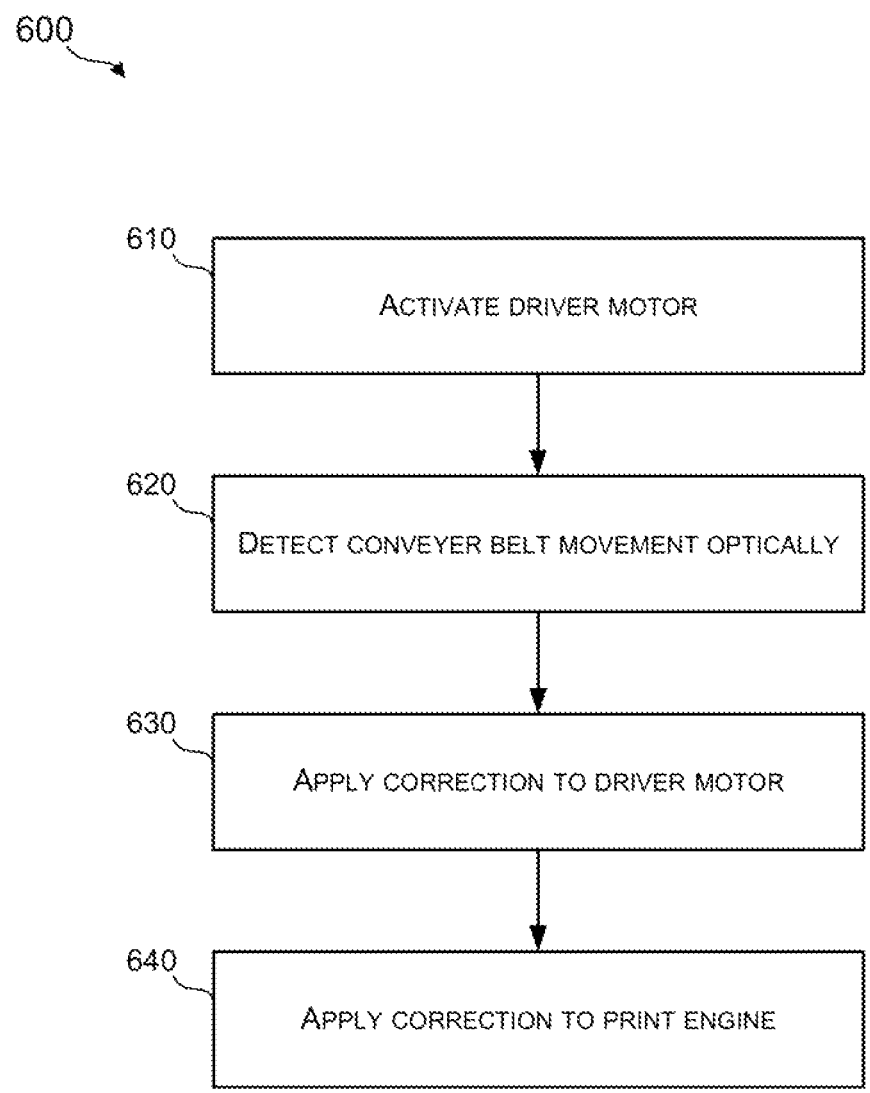
FIG. 6 is a flowchart of an example method for controlling a printer by tracking a conveyor belt assembly equipped an embedded optical sensor.

FIG. 6 depicts another example method 600 for controlling a conveyor belt assembly 100 according to various implementations. Method 600 can begin at box 610 in which print controller 320 can activate driver motor 140 to move conveyor belt 110 in coordination with a print engine 310 to generate a printed image on a print media disposed on the conveyor belt 110.

At box 620, print controller 320 can operate an embedded optical sensor 150 to optically detect the movement or position of conveyor belt 110. As described herein, optically detecting the movement of the conveyor belt 110 can include optically detecting the movement of markings on an interior surface (e.g., on a ridge profile 111) of conveyor belt 110. The optically detected movements of the conveyor belts based on the movement of the interior surface of the conveyor belt 110 can be represented by light level signals provided by the embedded optical sensor 150.

In some implementations, optically detecting the movement or position of the conveyor belt 110 can also include detecting the movements and position of a roller 130 and/or driver motor 140 used to drive the conveyor belt 110. In such implementations, print controller 320 can receive signals from an encoder in the driver motor 140 or roller 130 that indicates the movement, speed, or position of the roller 130 and/or driver motor 140.

Based on the detected movements or position of the conveyor belt 110, the roller 130, and/or driver motor 140, the print controller 320 can apply a correction to the signals used to drive the driver motor 140 to correct the movement or position of the conveyor belt 110. As described herein, applying the correction to driver motor 140 can include changing the speed or direction of the driver motor. As such, conveyor belt 110 can be sped up, slowed down, or moved in either direction to correct the position of a print media disposed thereon.

At box 640, print controller 320 may also apply a correction to the operation of the print engine 310. The correction to print engine 310 can be based on the optically detected movement or position of the conveyor belt 110, roller 130, driver motor 140, and/or the correction applied to driver motor 140. The correction to print engine 310 can include altering the rate, amount, or position, at which printing material is applied to print media on conveyor belts 110 to generate a quality printed image. In some implementations, correction to the print engine 310 can include augmenting or changing the print data to compensate for the optically detect movement or position of the conveyor belt 110, roller 130, driver motor 140, and/or the correction applied to driver motor 140.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A system comprising:
   a conveyor belt comprising an exterior surface and an interior surface;
   an embedded optical sensor disposed proximate to the interior surface of the conveyor belt to optically detect movement of the conveyor belt; and
   a driver to move the conveyor belt based on the optically detected movement of the conveyor belt,
   wherein the conveyor belt comprises a triangular ridge formed in the interior surface, the ridge comprising markings detectable by the embedded optical sensor to optically detect the movement of the conveyor belt.

2. The system of claim 1 further comprising:
   a first roller coupled to the driver and comprising a first groove; and
   a second roller comprising a second groove, wherein the conveyor belt is disposed around the first roller and the second roller with the ridge disposed in the first groove and the second groove to maintain alignment of the conveyor belt.

3. The system of claim 1 wherein the ridge comprises markings detectable by the optical sensor.

4. The system of claim 1, further comprising a print engine, and wherein the conveyor belt is positioned to move a print media relative to the print engine.

5. The system of claim 4 wherein the print engine applies printing material to the print media based on the detected movement.

6. A method comprising:
   activating a conveyor belt driver to move a conveyor belt;
   detecting movement of an interior surface of the conveyor belt optically using markings in a triangular ridge formed in the interior surface of the conveyor belt; and
   applying a correction to the conveyor belt driver based on the optically detected movement of the interior surface of the conveyor belt.

7. The method of claim 6, wherein activating the conveyor belt driver to move the conveyor belt causes a print media to move relative to a print engine, the method further comprising applying a printing material to the print media using the print engine.

8. The method of claim 7, further comprising applying a correction to the print engine based on the optically detected movement of the conveyor belt.

9. The method of claim 6, wherein detecting movement of the conveyor belt optically comprises detecting markings on the interior surface of the conveyor belt using an optical sensor disposed proximate to the interior surface of the conveyor belt.

10. The method of claim 9, wherein the markings are disposed on a ridge disposed on the interior surface of the conveyor belt and the optical sensor is disposed proximate to the ridge.

11. A printer comprising:
    a print engine to apply printing material to a print media;
    a media handler to move the print media relative to the print engine and comprising:
      a conveyor belt comprising an exterior surface and an interior surface;
      a driver to move the conveyor belt; and
      a vacuum handler to hold the print media against the conveyor belt;
    an embedded optical sensor disposed proximate to the interior surface of the conveyor belt to optically detect movement of the conveyor belt; and a print controller to control the driver or the print engine based on the detected movement of the conveyor belt, wherein the conveyor belt comprises a triangular ridge formed in the interior surface, the ridge comprising markings detectable by the embedded optical sensor to optically detect the movement of the conveyor belt.

12. The apparatus of claim 11, wherein the print controller controls the driver or the print engine to compensate for localized heating of the conveyor belt.

13. The apparatus of claim 11, wherein the print controller controls the driver or the print engine to compensate for slippage of the conveyor belt relative to the driver.

* * * * *

UNITED STATES PATENT AND TRADEMARK OFFICE
CERTIFICATE OF CORRECTION

| | | |
|---|---|---|
| PATENT NO. | : 10,518,563 B2 | Page 1 of 1 |
| APPLICATION NO. | : 15/759120 | |
| DATED | : December 31, 2019 | |
| INVENTOR(S) | : Roger Terradellas Callau et al. | |

It is certified that error appears in the above-identified patent and that said Letters Patent is hereby corrected as shown below:

In the Claims

In Column 11, Line 7, Claim 12, delete "apparatus" and insert -- printer --, therefor.

In Column 11, Line 10, Claim 13, delete "apparatus" and insert -- printer --, therefor.

Signed and Sealed this
Tenth Day of March, 2020

Andrei Iancu
*Director of the United States Patent and Trademark Office*